US012688298B2

(12) United States Patent
Givental et al.

(10) Patent No.: US 12,688,298 B2
(45) Date of Patent: Jul. 21, 2026

(54) FEATURE SELECTION FOR CYBERSECURITY THREAT DISPOSITION

(71) Applicant: INTERNATIONAL BUSINESS MACHINES CORPORATION, Armonk, NY (US)

(72) Inventors: Gary I. Givental, Bloomfield Hills, MI (US); Joel Rajakumar, Atlanta, GA (US); Aankur Bhatia, Bethpage, NY (US)

(73) Assignee: International Business Machines Corporation, Armonk, NY (US)

( * ) Notice: Subject to any disclaimer, the term of this patent is extended or adjusted under 35 U.S.C. 154(b) by 1090 days.

(21) Appl. No.: 17/643,619

(22) Filed: Dec. 10, 2021

(65) Prior Publication Data

US 2023/0185923 A1      Jun. 15, 2023

(51) Int. Cl.
*G06F 21/57* (2013.01)
*G06F 18/21* (2023.01)
(Continued)

(52) U.S. Cl.
CPC .......... *G06F 21/577* (2013.01); *G06F 18/214* (2023.01); *G06F 18/217* (2023.01); *G06N 5/045* (2013.01); *G06N 20/20* (2019.01)

(58) Field of Classification Search
None
See application file for complete search history.

(56) References Cited

U.S. PATENT DOCUMENTS

| | | |
|---|---|---|
| 9,210,185 B1 | 12/2015 | Pinney Wood |
| 10,015,188 B2 | 7/2018 | Schneider |

(Continued)

FOREIGN PATENT DOCUMENTS

| | | |
|---|---|---|
| EP | 3101599 A2 | 12/2016 |
| WO | WO-2018005001 A1 * | 1/2018 .............. G06F 21/55 |

OTHER PUBLICATIONS

Chauhan, Nitin Kumar, and Krishna Singh. "A review on conventional machine learning vs deep learning." 2018 International conference on computing, power and communication technologies (GUCON). IEEE, 2018. (Year: 2018).*

(Continued)

*Primary Examiner* — Michelle T Bechtold
*Assistant Examiner* — Kaitlyn R Haefner
(74) *Attorney, Agent, or Firm* — Kimberly Zillig

(57)      ABSTRACT

An apparatus, a method, and a computer program product are provided that dynamically selects features and machine learning models for optimal accuracy when determining a threat disposition of a security alert. The method includes training a base machine learning model, determining impacts that features in the training dataset have on the trained base machine learning model when predicting threat disposition on security threats, and creating subsets of the features, based on threat dispositions, by analyzing the features with their corresponding impacts and placing common features and impacts into each subset of the subsets. The method also includes training a plurality of machine learning models and a machine learning feature predictor using the training dataset and the subsets. The method further includes selecting, for a new input data instance, the selected features from the new input data instance and selecting a trained machine learning model trained based on the selected features.

14 Claims, 6 Drawing Sheets

(51) Int. Cl.
  *G06F 18/214*    (2023.01)
  *G06N 5/045*    (2023.01)
  *G06N 20/20*    (2019.01)

(56)      References Cited

U.S. PATENT DOCUMENTS

| | | | |
|---|---|---|---|
| 2017/0078308 A1 | 3/2017 | Temm | |
| 2020/0302524 A1* | 9/2020 | Kamkar | G06F 18/24133 |
| 2021/0383275 A1* | 12/2021 | Miroshnikov | G06N 20/00 |
| 2022/0398502 A1* | 12/2022 | Brito | G06N 20/20 |
| 2023/0083762 A1* | 3/2023 | Das | G06N 5/01 |
| | | | 706/12 |

OTHER PUBLICATIONS

Nunes, RÃ'mulo de O., et al. "An unsupervised-based dynamic feature selection for classification tasks." 2016 International Joint Conference on Neural Networks (IJCNN). IEEE, 2016. (Year: 2016).*

Bawany et al. DDoS attack detection and mitigation using SDN: methods, practices, and solutions. Arabian Journal for Science and Engineering 42.2 (2017): 425-441.

Beigi et al. "Towards effective feature selection in machine learning-based botnet detection approaches." 2014 IEEE Conference on Communications and Network Security. IEEE, 2014.

Gu et al. "Botminer: Clustering analysis of network traffic for protocol-and structure-independent botnet detection." Usenix, (2008): 139.

Mohammad et al., . "A multilayer perceptron artificial neural network approach for improving the accuracy of intrusion detection systems." Int J Artif Intell 9.4 (2020): 609-615.

R. d. O. Nunes, C. A. Dantas, A. M. P. Canuto and J. C. Xavier-Junior, "An unsupervised-based dynamic feature selection for classification tasks," 2016 International Joint Conference on Neural Networks (IJCNN), 2016, pp. 4213-4220, doi: 10.1109/IJCNN.2016. 7727749, https://www.researchgate.net/publication/309775714_An_unsupervised-based_dynamic_feature_selection_for_classification_tasks.

Wang et al., . "A dynamic MLP-based DDoS attack detection method using feature selection and feedback." Computers & Security 88 (2020): 101645.

Ye et al. "A DDoS attack detection method based on SVM in software defined network." Security and Communication Networks 2018 (2018).

* cited by examiner

300

RECEIVE TRAINING DATASET
310

TRAIN BASE MODEL
320

DETERMINE FEATURE
IMPACT 330

GENERATE FEATURE SETS
340

TRAIN ML MODEL
COLLECTION 350

TRAIN FEATURE PREDICTOR
360

SELECT FEATURE SET
370

SELECT ML MODEL
380

500

520-3

520-4

510

520-1

520-2

FEATURE SELECTION FOR CYBERSECURITY THREAT DISPOSITION

BACKGROUND

The present disclosure relates to security threat dispositions, and more specifically, to dynamically selecting features and machine learning models for optimal accuracy when determining a threat disposition of a security alert.

Enterprise security is a complex problem requiring the coordination across security policies, controls, threat models, and threat detection scenarios (use cases). The implementation of these policies, models, and controls requires extensive use of threat monitoring technologies, security devices, and resources that have security, business, and technical skills. The ever-increasing number of threats at scale requires automation in support of analysts responsible for preventing, detecting, and responding to these threats. In most cases, the analyst must manually search through a wide range of data sources, review past threat events and how they were handled, check for duplicate events, currently open events, and the knowledge database on the appropriate response procedures to handle the information. This data collection, analysis process, and final disposition determination of an alert is time consuming and tedious for an analyst.

Currently, there are a variety of tools that exist for threat monitoring to analyze a wide range of data sources including structured data, unstructured data, semi-structured data, and reference data to identify patterns that are indicative of threats, security policy, and control anomalies. When these threats and/or anomalies are detected, "actionable" alerts are created. In many cases, the number of alerts exceeds the capacity of the security analyst to handle the alerts effectively and efficiently. Security Operation Center (SOC) analysts are responsible for this process, and this is typically done by taking a closer look at the raw data associated with an alert including a review of both the contextual data and "raw" data from the data sources that triggered the alert. This data collection and investigation can be time-consuming and requires complex correlation analysis. The correlation of facts can include information that is general to the threat or considered an anomaly. Correlation can also require very specific information about a customer, their assets, and any other special instructions the customer may have provided regarding the proper handling of an alert. Additionally, security analysts may often need to do additional research to understand the nature of the threat, the vector of the attack, and discern whether the target is vulnerable.

Only once all known factors are considered, security analysts determine the optimal disposition for a specific alert. There are a range of possible dispositions including but not limited to: duplicate, false positive, currently open case, new case (first of a kind), and known alert. For each of these dispositions, there are a range of actions that the analyst can recommend including: closing the alert with no further action, holding the alert for further investigation, escalating the alert for additional review, and the like. In each of these cases, the analyst may be able to recommend the specific mitigation and remediation activities that are needed to deal with the alert.

SUMMARY

Embodiments of the present disclosure include a method for dynamically selecting features and machine learning models for optimal accuracy when determining a threat disposition of a security alert. The method includes training a base machine learning model using a training dataset to generate a trained base machine learning model, determining impacts that features in the training dataset have on the trained base machine learning model when predicting threat dispositions on security threats, and creating subsets of the features, based on threat dispositions, by analyzing the features with their corresponding impacts and placing common features and impacts into each subset of the subsets. The method also includes training a plurality of machine learning models with the subsets as training data where each subset is used by one of the machine learning models and training a machine learning feature predictor using the training dataset and the subsets of the features to output selected features used to predict the threat dispositions. The method further includes selecting, by the machine learning feature predictor, for a new input data instance, the selected features from the new input data instance and selecting a trained machine learning model from the plurality of the machine learning models trained based on the selected features.

Additional embodiments of the present disclosure include a computer program product for dynamically selecting features and machine learning models for optimal accuracy when determining a threat disposition of a security alert, a computer readable storage medium having a computer readable program stored therein, wherein the computer readable program, when executed on a computing device, causes the computing device to train a base machine learning model using a training dataset to generate a trained base machine learning model, determine impacts that features in the training dataset have on the trained base machine learning model when predicting threat disposition on security threat, and create subsets of the features, based on threat dispositions, by analyzing the features with their corresponding impacts and placing common features and impacts into each subset of the subsets. The computer program also causes the computing device to train a plurality of machine learning models with the subsets as training data where each subset is used by one of the machine learning models and train a machine learning feature predictor using the training dataset and the subsets of the features to output selected features used to predict the threat dispositions. The computer program further causes the computing device to select, by the machine learning feature predictor, for a new input data instance, the selected features from the new input data instance and select a trained machine learning model from the plurality of the machine learning models trained based on the selected features.

Further embodiments of the present disclosure include an apparatus for dynamically selecting features and machine learning models for optimal accuracy when determining a threat disposition of a security alert. The apparatus includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
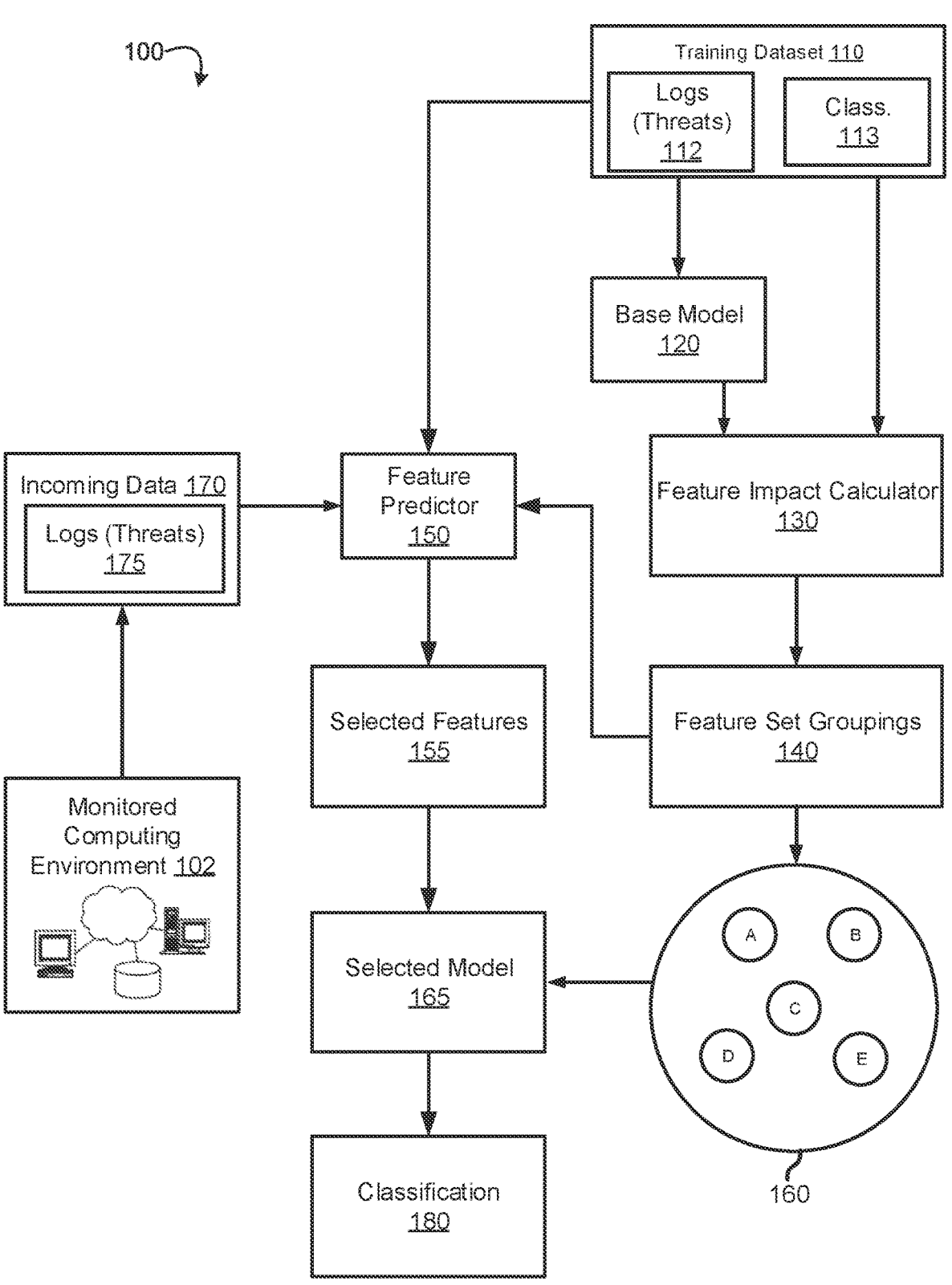
FIG. 1 is a block diagram illustrating an operation of the primary operational elements of an improved computing tool used by one or more embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to security threat dispositions, and more specifically, to dynamically selecting features and machine learning models for optimal accuracy when determining a threat disposition of a security alert. While the present disclosure is not necessarily limited to such applications, various aspects of the disclosure may be appreciated through a discussion of various examples using this context.

Detecting anomalies plays an important role in security management of modern computer system environments. Telemetry data, i.e., data collected at remote points with subsequent automatic transmission of the data to receiving equipment for monitoring, emitted by various security and endpoint computing devices is often used for such anomaly detection, where this data is often packaged as computer system log data structures, or entries into computer system log data structures (also referred to simply as "computer system logs" or just "logs").

To perform such anomaly detection, as described previously, human security analysts review the computer system logs, for example, via a Security Information and Event Management (SIEM) computing system, such as the IBM QRadar™ SIEM computing system available from International Business Machines (IBM) Corporation of Armonk, N.Y., using a rule engine and search mechanism. This manual process may operate well for small sized enterprises and managed security services providers (MSSPs), however with the increasing volume of data traffic associated with computing resources, there is an explosive growth of computer system log volumes making it impractical for a human security analyst to be able to review the computer system logs and identify anomalies accurately. In fact, even SIEM computing systems are often quite noisy in their application of the rules of the rule engine and application of search criteria, generating many false positives that require human security analyst review. Moreover, rules-based, and search-based SIEM computing systems require a large amount of manual tuning and codification by human security analysts of their own knowledge of what to look for when attempting to identify anomalies.

Known methodologies of using human security analyst review of computer system logs for anomalies is fast becoming an impracticality as the amount of data traffic flowing to and from computing system resources increases with the increased reliance on computing systems to provide desired functionalities. That is, as the data traffic increases, the complexity and volume of the computing system logs generated for the purpose of security and evaluation of proper functioning of the monitored computing system environment, also increases. Even known Security Information and Event Management (SIEM) systems often suffer from significant drawbacks due to false positives, manual tuning, representation of human security analyst knowledge, and the like.

Enterprise security is a complex problem requiring the coordination across security policies, controls, threat models, and threat detection scenarios (use cases). The implementation of these policies, models, and controls requires extensive use of threat monitoring technologies, security devices, and resources that have security, business, and technical skills. The ever-increasing number of threats at scale requires automation in support of analysts responsible for preventing, detecting, and responding to these threats. In most cases, the analyst must manually search through a wide range of data sources, review past threat events and how they were handled, check for duplicate events, currently open events, and the knowledge database on the appropriate response procedures to handle the information. This data collection, analysis process, and final disposition determination of an alert is time consuming and tedious for an analyst.

To reduce manual efforts, machine learning based anomaly detection mechanisms may be implemented where a computer executed machine learning model, such as a convolutional neural network (CNN), deep neural network (DNN), recurrent neural network (RNN), or other type of machine learning model are used. The process of training a machine learning (ML) model involves providing an ML algorithm (that is, the learning algorithm) with training data to learn from. The term "ML model" refers to the model artifact that is created by the training process. The training data contains the correct answer, which is known as a target or target attribute, and is also sometimes referred to as the "ground truth", such that the learning algorithm executes the ML model on the training data, generates an output based on the execution of the ML model on the training data, calculates a loss or error of the ML model relative to the correct answer, and then adjusts parameters of the ML model so as to reduce this loss or error. That is, the learning algorithm finds patterns in the training data that map the input data attributes to the target (the answer that the ML model should predict), and the learning algorithm outputs a trained ML model that captures these patterns.

ML model-based anomaly detection mechanism may be implemented in order to classify computer system security logs. A variety of different ML models may be used for classifying computer system security logs, and in some cases an ensemble of such ML models may be utilized, such as an ensemble of the Random Forest, Gradient Boosting, and Deep Learning machine learning models, also referred to as "classifiers", as they classify the state of the computing system from the log data structure as to whether it is anomalous or not. In order to determine which ML model(s) to use in the particular anomaly detection mechanism being implemented, selection techniques may involve obtaining a score of each ML model on the entire dataset to determine whether to use the particular ML model. This score is calculated based on a determined accuracy of the ML model output on the entire dataset, such as based on user feedback on the outputs generated by the ML model, e.g., if the ML model indicates that the input is representative of a security threat or anomaly, a human user may review that output classification and determine if it is a true threat or a false positive and this information may be used to determine the accuracy of the ML model in predicting security threats/ anomalies. Thus, the scoring is across the entire dataset which may encompass various types of security risks, attacks, threats, anomalies, etc.

Limitations on automated threat disposition remain, however, as different feature weightings may result in greater efficiency for some threats while having lower efficiency for other threats. ML models can operate better for different types of security risks based on training data used to train the ML models. That is, some ML models, due to their training, may be better predictors and classifiers of particular patterns of input data indicative of particular security threats, anomalies, attacks, etc. (collectively referred to herein as "security risks"), than they are for other security risks because they have been trained using particular features derived from the input data. Thus, scoring these ML models across an entire dataset may provide an inaccurate assessment of the ML model as the ML model's performance will be scored differently based on whether the ML model is trained certain features from a dataset that optimally identify certain security risks. Hence, there is a need for a solution that provides a finer grain selection of feature selection for training ML models to detect certain security risks.

Embodiments of the present disclosure may overcome the above, and other problems, by providing mechanisms for dynamic feature selection from logs used for training and utilizing ML models in threat disposition of security risks. The dynamic feature selection can be based on the ML model's performance on feature subsets selected from the logs. For example, a plurality of different ML models may be trained using a different subset of features derived from the logs. Each ML model can be evaluated to determine the accuracy in detecting particular security risks.

More specifically, embodiments of the present disclosure apply a feature predictor that dynamically selects features from logs that can be used on an ML model for providing a threat disposition of a potential security risk. The feature predictor can be trained, alongside a base ML model using subsets of features derived from the logs. The base ML model can be evaluated to determine which features impact its prediction the most and those features can be grouped together into common feature sets that can be used further train the feature predictor. The common feature sets can be used to train a plurality of ML models where each model is optimally trained for certain security risks based on the common feature set used.

An incoming log is analyzed by the feature predictor to derive a feature set to use when evaluating a security risk. Based on the feature set, a corresponding ML model can be selected that can optimally predict a threat disposition using that feature set. Once selected the ML can make a classification and produce a threat disposition, e.g., anomalous (security risk or threat) or non-anomalous. This mechanism enables different ML models to be utilized on different feature subsets within the log dataset. That is, while individual ML models may not perform well overall on all the features of the logs, they will perform well on particular types of features derived from the logs. Thus, embodiments of the disclosure utilize different subsets of features derived from logs and ML models trained using the different feature subsets, such that a plurality of ML models are implemented, each for processing their corresponding feature subset from the logs to produce a high overall predictive accuracy.

FIG. 1 is a block diagram illustrating an operation of primary operational elements of an improved computing tool 100 for dynamic feature selection and threat disposition, in accordance with embodiments of the present disclosure. The computing tool 100 includes a monitored computing environment 102, a training dataset 110, a base model 120 a feature impact calculator 130, feature set groupings 140, a feature predictor 150, selected features 155, and an ML model collection 160. For purposes of the present description, it will be assumed that the illustrative embodiments are being implemented as part of a computer security mechanism and specifically are directed to threat dispositions of information located within security event log data. However, this is only one possible implementation, and is not intended to be limiting on the present disclosure. Other implementations in which anomalous patterns within input data may be identified, may also be used without departing from the spirit and scope of the present disclosure.

In order to be able to dynamically select features from incoming data 170 during runtime operation, a machine learning feature predictor 150 requires training from the training dataset 110 to classify features in the incoming logs 175 into subsets of features and identify a corresponding ML model associated with that subset of features.

With regard to the training of the machine learning feature selector 150, a training dataset 110 is provided by a training dataset source (not shown). The training data in the training dataset 110 includes training data entries, representing security log entries, which each may represent non-security risk data and/or represent security risks, e.g., security threats, attacks, anomalies, etc. Each training data entry also has a corresponding classification for that training data entry, e.g., close (non-anomalous) or escalate (anomalous). Additionally, the training dataset 110 includes having entries, e.g., logs, data instances, etc. that represent non-security risk and security risks 112, along with their corresponding correct classifications 113, or ground truth classifications.

The base model 120 is a component of the improved computing tool 100 configured as a machine learning model and trained to identify security risks detectable within the logs. The base model 120 can be configured as various types of ML models. These ML models include convolutional neural networks (CNNs), deep neural networks (DNNs), recurrent neural networks (RNNs), or other types of machine learning models. For example, the base model 120 can be a deep learning model, a random forest model, a gradient boost model, a support vector machine, and the like. The base model 120 is trained to classify the input as to whether the logged events should be escalated or not, where escalation refers to the logged event being presented as an anomaly for further review or automated responsive action by a downstream computing system, such as a SIEM system or the like. It should be noted, this is only one possible implementation and it should be appreciated that other embodiments may be configured to provide classifications of different levels of granularity, and complexity. For example, the base model 120 can provide individual classifications for different types of security risks, such as vector outputs in which each vector slot corresponds to a different classification and values in each of the vector slots indicate a probability that the corresponding classification applies to the particular inputs.

The feature impact calculator 130 is a component of the improved computing tool 100 configured to provide impact calculations of the features used by the base model 120. The impact calculations, or feature importance, can determine which features impact the base model's 120 predictions. The feature impact calculator 130 can implement various techniques to determine feature impact calculations. These techniques include, but are not limited to, local interpretable model-agnostic explanations (LIME) and partial dependence plot (PDP). For example, using the LIME technique, the feature impact calculator 130 can test the base model 120 by giving variations of the training dataset 110 and analyze the changes to the predictions. The feature impact calculator 130 can generate a new dataset consisting of perturbed samples and the corresponding prediction of the base model 120. Using the new dataset, the feature impact calculator 130 can train an interpretable model (not shown), which is weighted by the proximity of the sampled instances to the instance of interest. The interpretable model can be analyzed to explain the predictions and determine which features have the most impact.

The feature impact calculator 130 is further configured to generate feature set groupings 140 based on the impact calculations features have on threat predictions. Certain features contained with the logs 112, 175 can have a greater impact on certain predictions. For example, a threat prediction detecting account manipulation may be more accurately predicted when an ML model uses account login information, times of login, IP addresses used, etc., when making that prediction. The feature impact calculator 130 can bundle these features based on which features have the most effect on different local regions of the data (e.g., types of security threats). In some embodiments, the feature impact calculator 130 utilizes a dynamic feature selection technique using data clustering algorithms to select features in a dynamic way and the selected features can be used as the feature set groupings 140.

The ML model collection 160 are a collection of ML models trained using the feature set groupings 140 generated by the feature impact calculator 130. The ML model collection 160 can include various types of ML models. These ML models include CNNs, DNNs, RNNS, or other types of machine learning models. For example, the ML model collection 160 can include deep learning models, random forest models, gradient boost models, support vector machines, and the like. The ML model collection 160 a trained ML model trained with one of the feature set groups. The ML model collection 160 can include ML models for each feature set so that a specific model can be used for specific feature set groupings. The ML model collection 160 can provide individual classifications for different types of security risks, such as vector outputs in which each vector slot corresponds to a different classification and values in each of the vector slots indicate a probability that the corresponding classification applies to the inputs.

The feature predictor 150 is configured as a machine learning model and trained to identify feature set groupings for security risks detectable within the logs. The feature predictor 150 can be configured as various types of ML models. These ML models include CNNs, DNNs, RNNS, or other types of machine learning models. For example, feature predictor 150 can be a deep learning model, a random forest model, a gradient boost model, a support vector machine, and the like. The feature predictor 150 can provide individual classifications for different types of security risks, such as vector outputs in which each vector slot corresponds to a different classification and values in each of the vector slots indicate a probability that the corresponding classification applies to the particular inputs. Using the feature set groupings 140, the feature predictor 150 can select the feature set that corresponds to the predicted security risk. The selected features 155 can then be used to select a corresponding ML model 165 from the ML model collection 160 that was trained using those features. The selected ML model 165 can then be used to generate a classification 180 for the incoming data 170.

It is noted that FIG. 1 is intended to depict the major representative components of a improved computing tool 100. In some embodiments, however, individual components may have greater or lesser complexity than as represented in FIG. 1, components other than or in addition to those shown in FIG. 1 may be present, and the number, type, and configuration of such components may vary.

Figure 2:
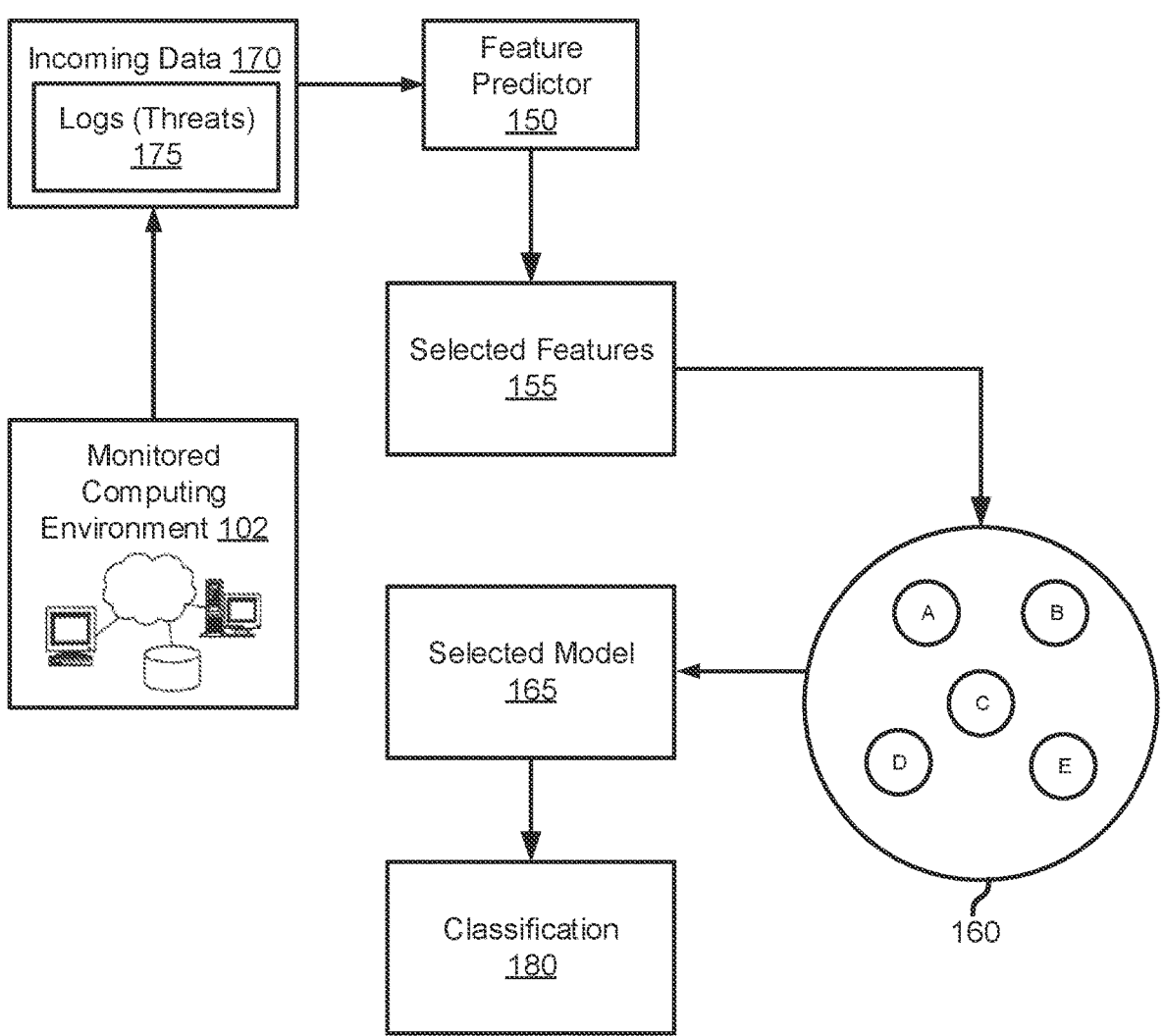
FIG. 2 is a block diagram illustrating an operation of a trained machine learning feature selector and machine learning models during runtime operation when processing a new input log data structure that are used by one or more embodiments of the present disclosure.

Having trained the feature predictor 150 and the ML model collection 160 in the manner described above, during runtime operation, as shown in FIG. 2, the feature predictor 150 can receive incoming data 195 in the form of a logged data structure from a monitored computing environment 102 having a plurality of computing system resources, e.g., hardware and/or software resources, data structures, and the like, where the incoming data 195 includes logs 197 which may represent non-anomalous events and/or anomalous events indicative of a security threat, attack, anomaly, or the like.

The feature predictor 150 can generate a prediction of a classification of the incoming log and a feature set 155 corresponding to that classification. The feature set 155, in turn is associated with a corresponding trained ML model from the ML model collection 160. The feature set 155 by the feature predictor 150 is thereby converted to a ML model selection which can then be used to process the incoming log and classify it as to whether it should be CLOSE or ESCALATE. This process may be repeated for each log in a log data structure of the incoming data 195 such that a plurality of classifications, one for each of the logs in the log data structure, may be generated. In some illustrative embodiments, a combination of these classifications may be used to generate a single classification for the log data structure as a whole, such as by using a logical "OR" operation, for example. In some cases, the probability/confidence values or scores may be combined using a suitable function to generate an overall probability/confidence score for the log data structure as a whole, e.g., an average of the individual probability/confidence scores, a weighted average where certain ML models may be given greater weight values than others, or the like.

The resulting classification output 180 generated by the selected ML model from the ML model collection 160 may be output to a STEM system or other downstream computing system for performance of a responsive action. The responsive action may take any known or later developed form including output a notification to a human analyst, such as via a user interface, for those logs or log data structures whose classification is determined to be ESCALATE. The user interface may comprise user interface elements for drilling down into the details of the notification, including identifying the individual logs within the log data structure and their corresponding classifications by corresponding ML models. In this way, the human analyst may identify which logs contributed to an ESCALATE classification for the log data file and which ML models generated the classifications. Moreover, probability/confidence values, weighting values, and the like, for the classifications of the logs may be provided in the notification to indicate more basis for the classification of the log data structure and/or individual logs. User interface elements may be provided for allowing the user to provide input to indicate a correctness/incorrectness of the classification of the logs and/or log data structure such that this information may be stored for creation of new training datasets for updating the training of the ML models and/or ML model selector at a future time.

Thus, the illustrative embodiments provide mechanisms for dynamically identifying which features are best suited, i.e., provide the best accuracy, confidence, and lowest risks with regard to misprediction, for each of the types of logs within a log data structure representing security events occurring within a monitored computing system environment. Additionally, the mechanisms of the illustrative embodiments may operate in conjunction with SIEM systems and/or other downstream computing systems to perform responsive actions in the event that a classification indicates a need to escalate the processing of the log data structure, which may include outputting notifications via user interfaces that may provide functionality for drilling down into the details of the individual logs, their classifications, and the like.

Figure 3:
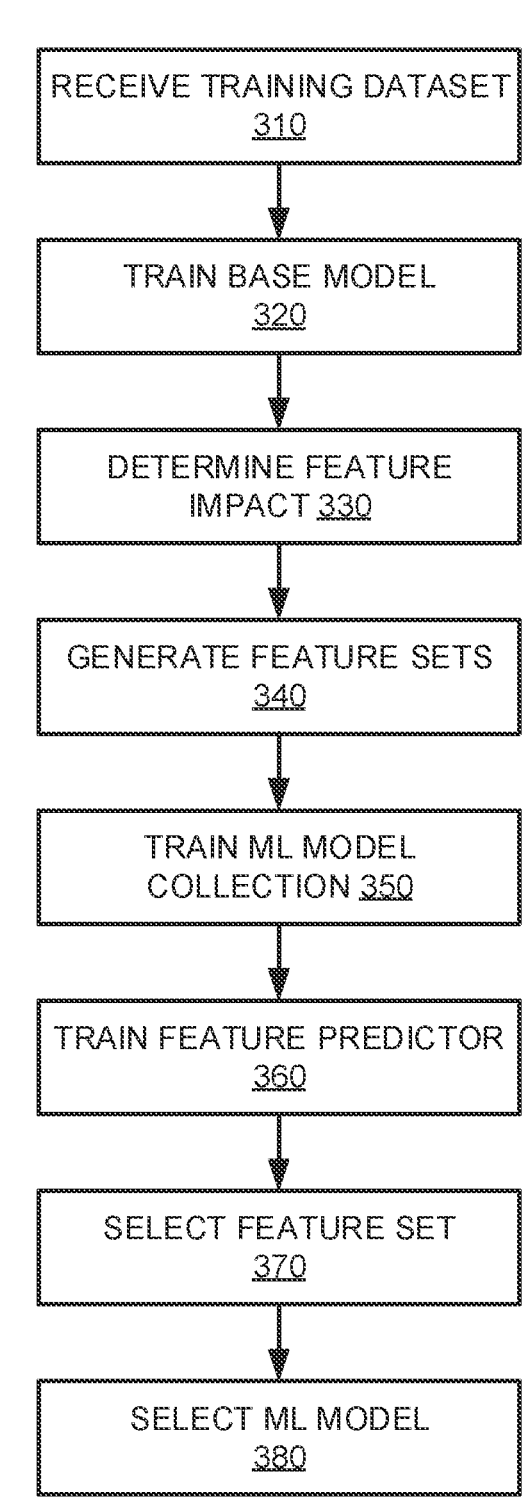
FIG. 3 is a flow diagram illustrating a process of training a machine learning feature selector and machine learning models and performed in accordance with embodiments of the present disclosure.

FIG. 3 is a flow diagram illustrating a process 300 of training a machine learning (ML) feature selector 150 and a ML model collection 160, in accordance with embodiments of the present disclosure. As shown in FIG. 3, the process 300 begins receiving a training dataset 110 comprising entries corresponding to security risks, e.g., threats, alerts, anomalies, etc., and their corresponding correct classifications, e.g., CLOSE or ESCALATE. This is illustrated at step 310. A base model 120 is trained using the training dataset 110. This is illustrated at step 320.

The base model is then used by a feature impact calculator 130 to determine the impact the features have on the classifications. This is illustrated at step 330. The impact calculations, or feature importance, can determine which features impact the base model's 120 predictions. The feature impact calculator 130 can implement various techniques to determine feature impact calculations. These techniques include, but are not limited to, local interpretable model-agnostic explanations (LIME) and partial dependence plot (PDP).

The feature impact calculator 130 generates feature set groupings 140. This is illustrated at step 340. The feature impact calculator 130 can bundle these features based on which features have the most effect on different local regions of the data (e.g., types of security threats). In some embodiments, the feature impact calculator 130 utilizes a dynamic feature selection technique using data clustering algorithms to select features in a dynamic way and the selected features can be used as the feature set groupings 140.

ML models within the ML model collection 160 are individually trained using each of the feature sets 140. This is illustrated at step 350. The ML model collection 160 can include ML models for each feature set so that a specific model can be used for specific feature set groupings. The ML model collection 160 can provide individual classifications for different types of security risks, such as vector outputs in which each vector slot corresponds to a different classification and values in each of the vector slots indicate a probability that the corresponding classification applies to the inputs.

The feature predictor 150 is trained using the training dataset 110. This is illustrated at step 360. The feature predictor 150 can provide individual classifications for different types of security risks, such as vector outputs in which each vector slot corresponds to a different classification and values in each of the vector slots indicate a probability that the corresponding classification applies to the particular inputs. Using the feature set groupings 140, the feature predictor 150 can select the feature set that corresponds to the predicted security risk. This is illustrated at step 370. The selected features 155 can then be used to select a corresponding ML model 165 from the ML model collection 160 that was trained using those features. This is illustrated at step 380. The selected ML model 165 can then be used to generate a classification 180 for the incoming data 170.

Figure 4:
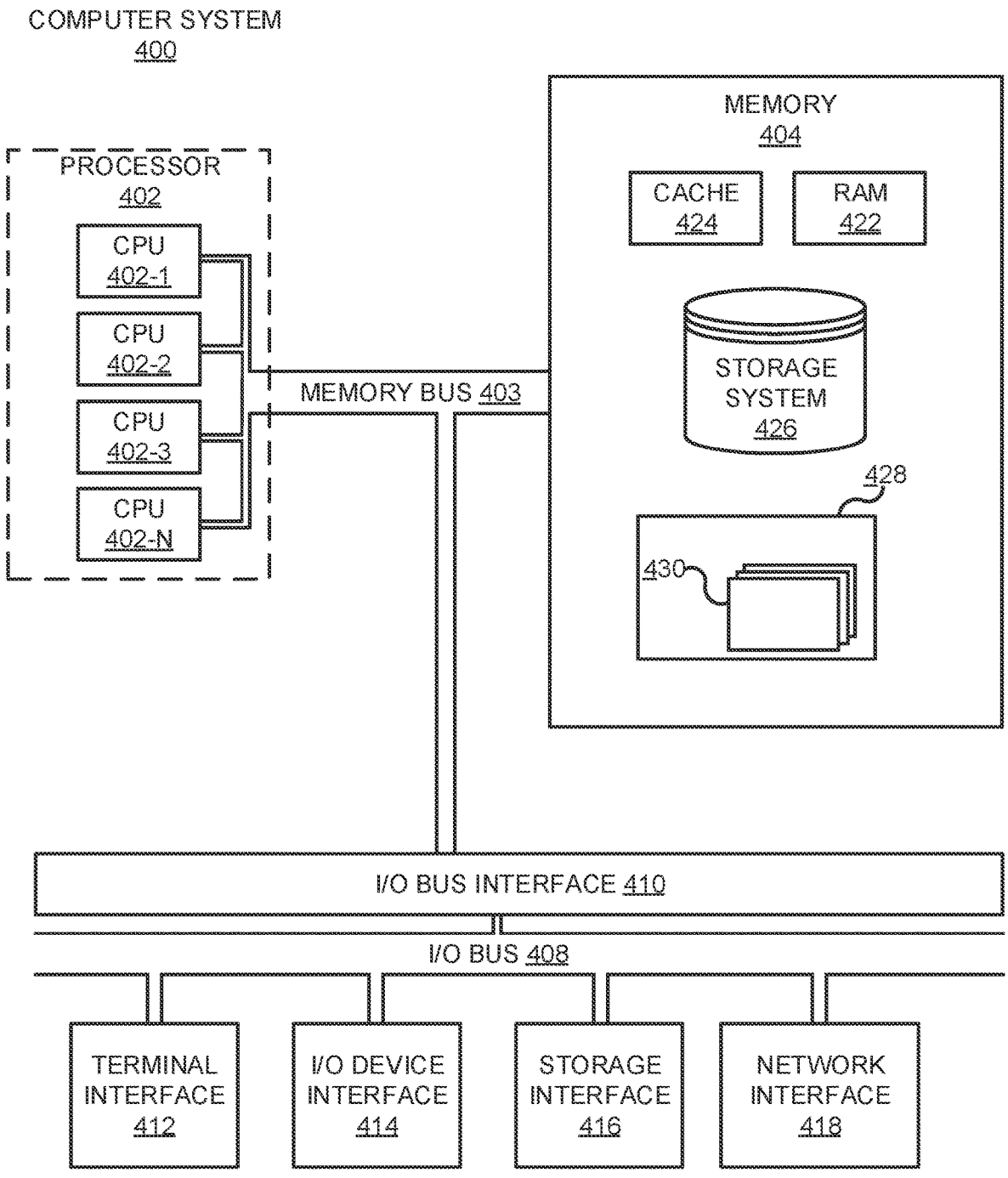
FIG. 4 is a high-level block diagram illustrating an example computer system that may be used in implementing one or more of the methods, tools, and modules, and any related functions, described herein in which the disclosure may be implemented.

Referring now to FIG. 4, shown is a high-level block diagram of an example computer system 400 (e.g., the improved computing tool 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, an I/O (Input/Output) device interface 414, a storage interface 416, and a network interface 418, all of which may be communicatively coupled, directly or indirectly, for inter-component communication via a memory bus 403, an I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments, the computer system 400 may alternatively be a single CPU system. Each processor 402 may execute instructions stored in the memory 404 and may include one or more levels of onboard cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments, some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 (e.g., the improved computing tool 100), may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations).

It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 5:
FIG. 5 depicts a cloud computing environment in accordance with embodiments of the present disclosure.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (P.D.A.) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1 to 520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
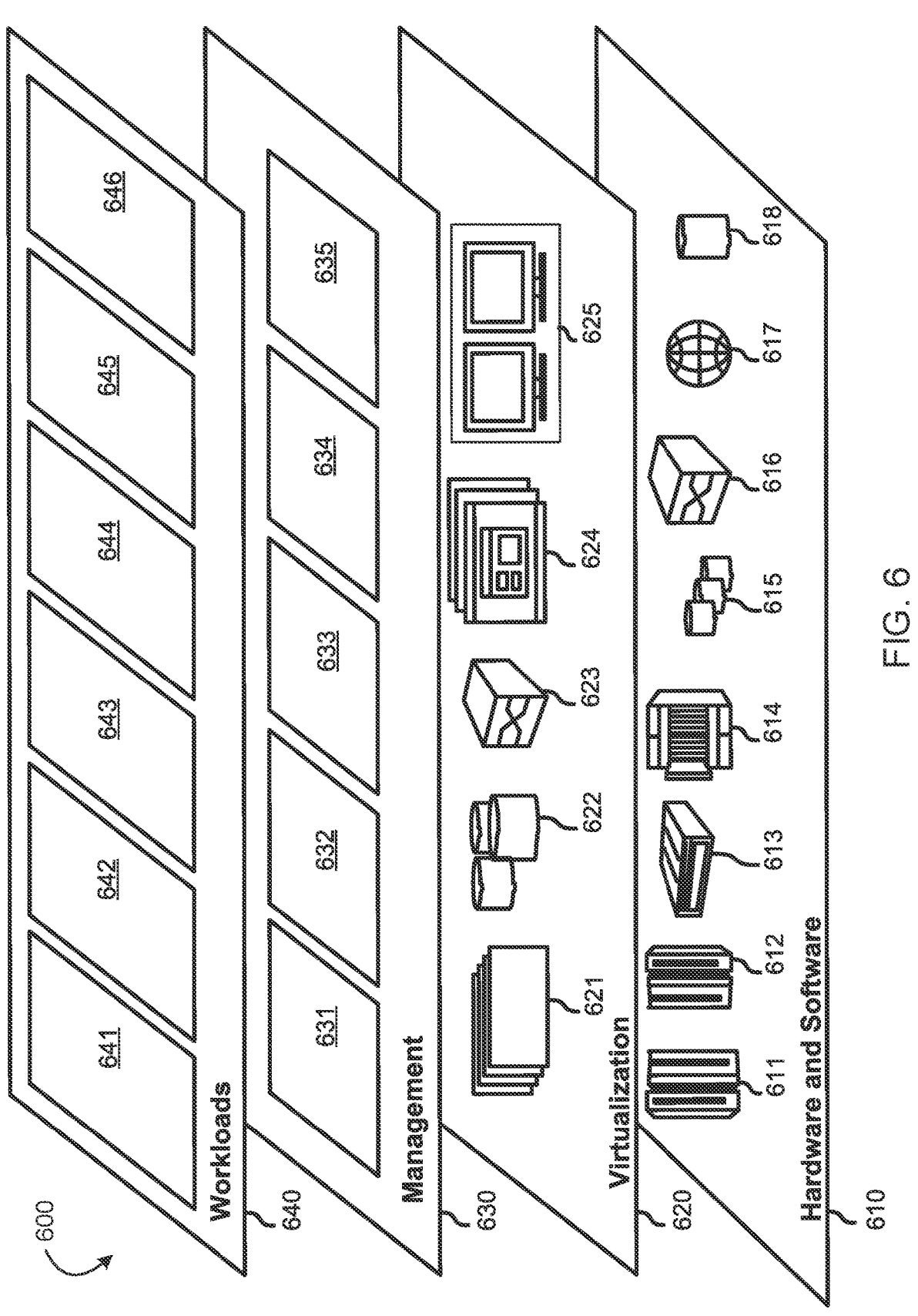
FIG. 6 depicts abstraction model layers in accordance with embodiments of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 610 includes hardware and software components. Examples of hardware components include mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 may provide the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (S.L.A.) planning and fulfillment 635 provide pre-arrangement for, and procurement of, cloud computing resources for which a future requirement is anticipated in accordance with an S.L.A.

Workloads layer 640 provides examples of functionality for which the cloud computing environment may be utilized. Examples of workloads and functions which may be provided from this layer include mapping and navigation 641; software development and lifecycle management 642 (e.g., improved computing tool 100); virtual classroom education delivery 643; data analytics processing 644; transaction processing 645; and a threat similarity analysis system 646.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

It should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

Moreover, references to "models" or a "model" in the present description specifically refers to computer executed machine learning models. These models comprise algorithms, statistical models, and the like, that computer systems use to perform a specific task without using explicit instructions, but instead relying on patterns and inference instead. Machine learning algorithms build a computer executed model based on sample data, known as "training data", in order to make predictions or decisions without being explicitly programmed to perform the task. Examples of machine learning models include, but are not limited to, supervised machine learning models such as convolutional neural networks (CNNs), deep neural networks (DNNs), and the like, as well as unsupervised machine learning models such as Isolation Forest models, One-Class Support Vector Machine (SVM) models, Local Outlier Factor models, and the like, ensemble learning mechanisms such as Random Forest models, and the like.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically selecting features and machine learning models for optimal accuracy when determining a threat disposition of a security alert, the method comprising:

training a base machine learning model using a training dataset to generate a trained base machine learning model, wherein the trained base machine learning model is adapted to identify security threats detectable within the training dataset;

determining impacts that features in the training dataset have on the trained base machine learning model when predicting threat dispositions on the security threats using a machine learning feature impact calculator, wherein the machine learning feature impact calculator utilizes a dynamic feature selection technique using data clustering algorithms to select the features in a dynamic way, wherein the determining includes applying at least one interpretability technique selected from a group consisting of: a local interpretable model-agnostic explanation (LIME) technique, and a partial-dependence-plot (PDP) technique;

testing the base machine learning model using the machine learning feature impact calculator by giving variations of the training dataset and analyzing changes to the predicting the threat dispositions on the security threats;

creating subsets of the features, based on threat dispositions, by analyzing the features with their corresponding impacts and placing common features and impacts into the subsets responsive to confidence values associated with classifications exceeding a confidence threshold;

training a plurality of machine learning models for the security threats with the subsets as training data where a corresponding subset is used by one of the machine learning models, wherein the plurality of machine learning models process the corresponding subset of the subsets from the training dataset to produce a high overall predictive accuracy, and the plurality of machine learning models generates a classification output for a different type of security threat;

training a machine learning feature predictor using the training dataset and the subsets of the features to output selected features used to predict the threat dispositions;

receiving a new data instance representing a security event;

selecting features for the new data instance that are dynamically identified as relevant to determining a threat disposition for the new data instance;

selecting a trained machine learning model from the plurality of machine learning models trained based on the selected features, wherein the selecting the trained machine learning model includes identifying, at run-time, the trained machine learning model associated with the dynamically identified features;

generating the classification output of the trained machine learning model; and determining the threat disposition using the selected trained machine learning model.

2. The method of claim 1, wherein the creating the subsets of the features, based on the threat dispositions, by analyzing the features with their corresponding impacts and placing common features and impacts into a first subset of the subsets, further comprises for a first feature in the features, and an impact of the first feature, processing the first feature as an input to the trained base machine learning model to generate the classification output comprising a classification and an associated confidence value;

evaluating the impact that the first feature has on the classification output by analyzing the associated confidence value; and placing the first feature into a subset of other features that have confidence values that exceed the confidence threshold for the classification.

3. The method of claim 1, wherein selecting, the trained machine learning model from the plurality of machine learning models, comprises selecting a subset of two or more trained machine learning models from the plurality of machine learning models for inclusion in an ensemble of trained machine learning models.

4. The method of claim 1, wherein the selecting the features for the new data instance, is performed dynamically for the new data instance in a plurality of different new data instances, in response to receiving the new data instance.

5. The method of claim 1, wherein the classification output is selected from a group consisting of escalate and close.

6. A computer program product for dynamically selecting features and machine learning models for optimal accuracy when determining a threat disposition of a security alert, the computer program product comprising a computer readable storage medium having a computer readable program stored therein, wherein the computer readable program, when executed on a computing device, causes the computing device to:

train a base machine learning model using a training dataset to generate a trained base machine learning model, wherein the trained base machine learning model is adapted to identify security threats detectable within the training dataset;

determine impacts that features in the training dataset have on the trained base machine learning model when predicting threat disposition on the security threats using a machine learning feature impact calculator, wherein the machine learning feature impact calculator utilizes a dynamic feature selection technique using data clustering algorithms to select the features in a dynamic way, wherein the determine includes apply at least one interpretability technique selected from a group consisting of: a local interpretable model-agnostic explanation (LIME) technique, and a partial-dependence-plot (PDP) technique;

test the base machine learning model using the machine learning feature impact calculator by giving variations of the training dataset and analyzing changes to the predicting the threat dispositions on the security threats;

create subsets of the features, based on threat dispositions, by analyzing the features with their corresponding impacts and placing common features and impacts into the subsets responsive to confidence values associated with classifications exceeding a confidence threshold;

train a plurality of machine learning models for the security threats with the subsets as training data where a corresponding subset is used by one of the machine learning models, wherein the plurality of machine learning models process the corresponding subset of the subsets from the training dataset to produce a high overall predictive accuracy, and the plurality of machine learning models generate a classification output for a different type of security threat;

train a machine learning feature predictor using the training dataset and the subsets of the features to output selected features used to predict the threat dispositions;

receive a new data instance representing a security event;

select features for the new data instance that are dynamically identified as relevant to determining a threat disposition for the new data instance;

select a trained machine learning model from the plurality of machine learning models trained based on the selected features, wherein the select the trained machine learning model includes identify, at runtime, the trained machine learning model associated with the dynamically identified features;

generate the classification output of the trained machine learning model; and determine the threat disposition using the selected trained machine learning model.

7. The computer program product of claim 6, wherein the create the subsets of the features, based on the threat dispositions, for a first feature in the features, and an impact of the first feature, causes the computing device to:

process the first feature as an input to the trained base machine learning model to generate the classification output comprising a classification and an associated confidence value;

evaluate the impact that the first feature has on the classification output by analyzing the associated confidence value; and place the first feature into a subset of other features that have confidence values that exceed the confidence threshold for the classification.

8. The computer program product of claim 6, wherein select, the trained machine learning model from the plurality of machine learning models, causes the computing device to select a subset of two or more trained machine learning models from the plurality of machine learning models for inclusion in an ensemble of trained machine learning models.

9. The computer program product of claim 6, wherein the select the selected features from the new data instance is performed dynamically for the new data instance in a plurality of different new data instances, in response to receiving the new data instance.

10. The computer program product of claim 6, wherein the classification output is selected from a group consisting of escalate and close.

11. An apparatus for dynamically selecting features and machine learning models for optimal accuracy when determining a threat disposition of a security alert, the apparatus comprising:

a processor; and a memory coupled to the processor, wherein the memory comprises instructions which, when executed by the processor, cause the processor to:

train a base machine learning model using a training dataset to generate a trained base machine learning model, wherein the trained base machine learning model is adapted to identify security threats detectable within the training dataset;

determine impacts that features in the training dataset have on the trained base machine learning model when predicting threat disposition on the security threats using a machine learning feature impact calculator, wherein the machine learning feature impact calculator utilizes a dynamic feature selection technique using data clustering algorithms to select the features in a dynamic way, wherein the determine includes apply at least one interpretability technique selected from a group consisting of: a local interpretable model-agnostic explanation (LIME) technique, and a partial-dependence-plot (PDP) technique;

test the base machine learning model using the machine learning feature impact calculator by giving variations of the training dataset and analyzing changes to the predicting the threat dispositions on the security threats;

create subsets of the features, based on threat dispositions, by analyzing the features with their corresponding impacts and placing common features and impacts into the subsets responsive to confidence values associated with classifications exceeding a confidence threshold;

train a plurality of machine learning models for the security threats with the subsets as training data where a corresponding subset is used by one of the machine learning models, wherein the plurality of machine learning models process the corresponding subset of the subsets from the training dataset to produce a high overall predictive accuracy, and the plurality of machine learning models generate a classification output for a different type of security threat;

train a machine learning feature predictor using the training dataset and the subsets of the features to output selected features used to predict the threat dispositions;

receive a new data instance representing a security event;

select features for the new data instance that are dynamically identified as relevant to determining a threat disposition for the new data instance;

select a trained machine learning model from the plurality of machine learning models trained based on the selected features, wherein the select the trained machine learning model includes identify, at runtime, the trained machine learning model associated with the dynamically identified features;

generate the classification output of the trained machine learning model; and determine the threat disposition using the selected trained machine learning model.

12. The apparatus of claim 11, wherein the create the subsets of the features, based on the threat dispositions, for a first feature in the features, and an impact of the first feature, causes the processor to:

process the first feature as an input to the trained base machine learning model to generate the classification output comprising a classification and an associated confidence value;

evaluate the impact that the first feature has on the classification output by analyzing the associated confidence value; and place the first feature into a subset of other features that have confidence values that exceed the confidence threshold for the classification.

13. The apparatus of claim 11, wherein the select the trained machine learning model from the plurality of machine learning models causes the processor to select a subset of two or more trained machine learning models from the plurality of machine learning models for inclusion in an ensemble of trained machine learning models.

14. The apparatus of claim 11, wherein the classification output is selected from a group consisting of escalate and close.

* * * * *